Sept. 11, 1923.

H. W. McMULLIN

GEAR SHIFT

Filed Jan. 20, 1921

Inventor

H. W. McMullin.

Attorney

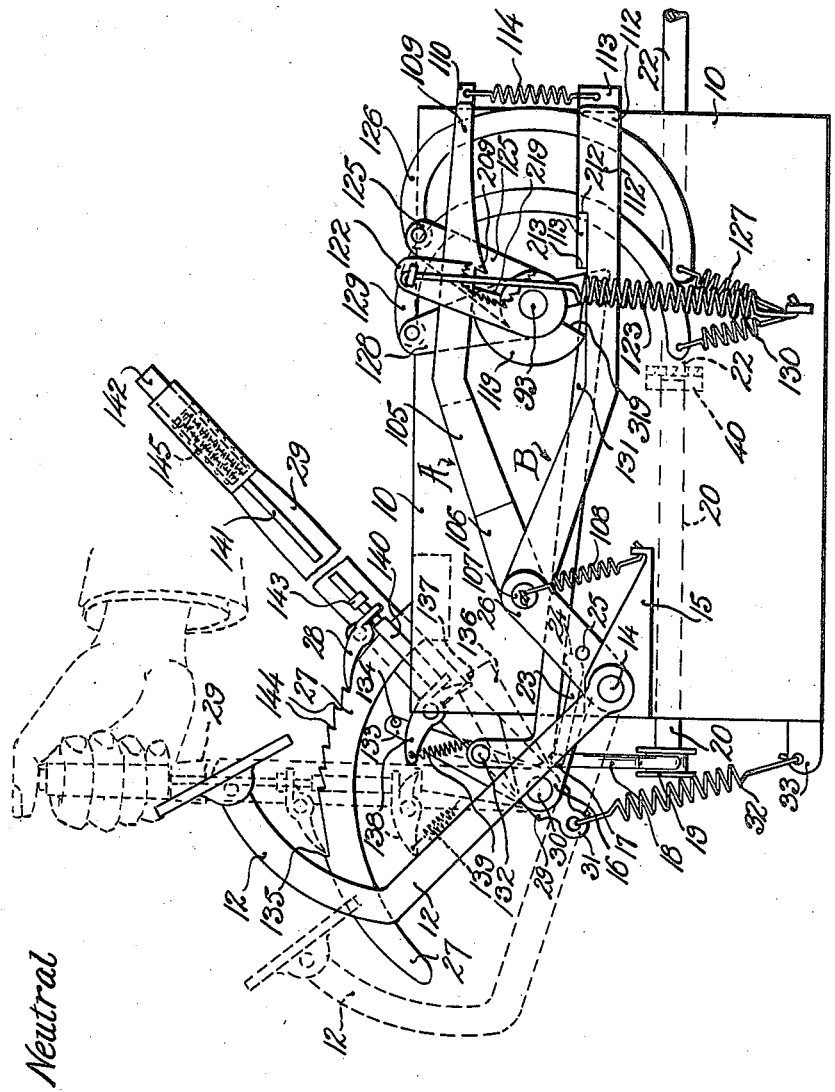

Sept. 11, 1923.

H. W. McMULLIN

GEAR SHIFT

Filed Jan. 20, 1921

Neutral

H. W. McMullin.
INVENTOR.

BY
ATTORNEY

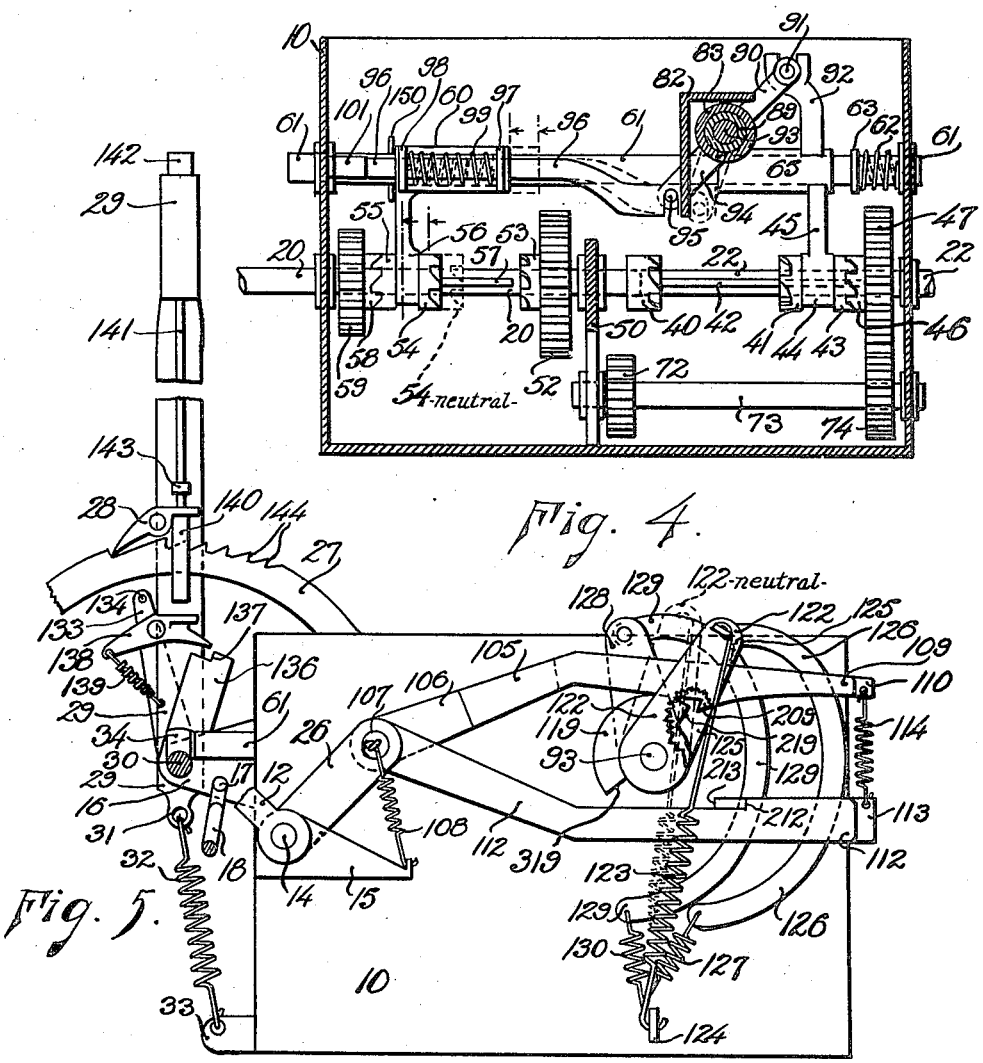

Sept. 11, 1923.

H. W. McMULLIN

GEAR SHIFT

Filed Jan. 20, 1921

H. W. McMullin, INVENTOR.

BY

ATTORNEY

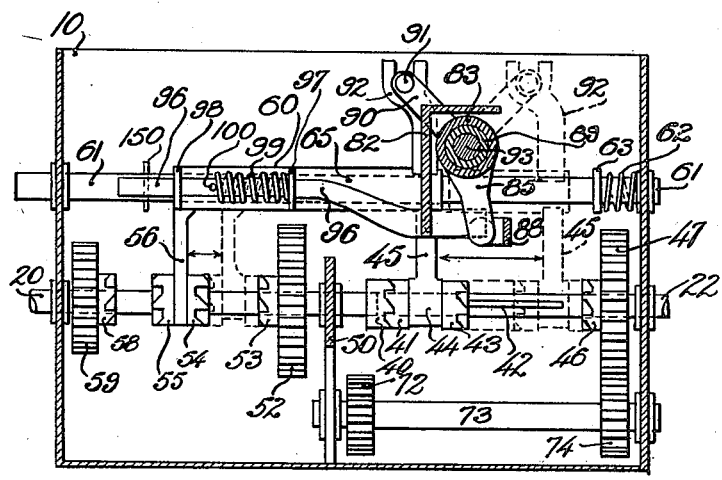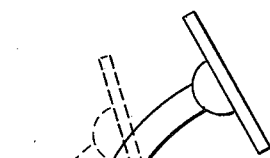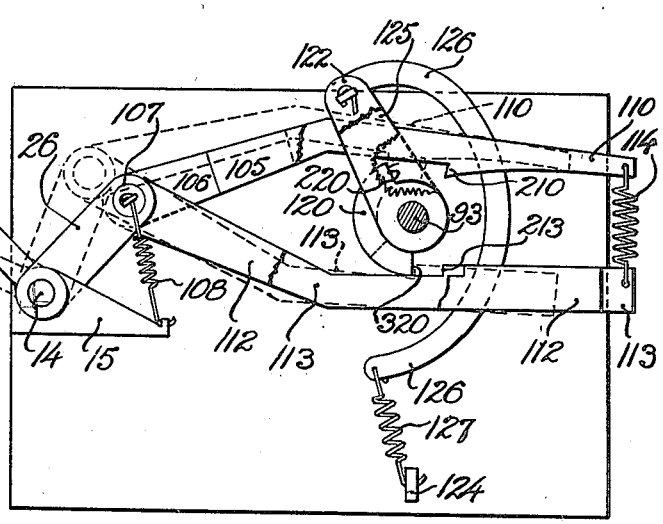

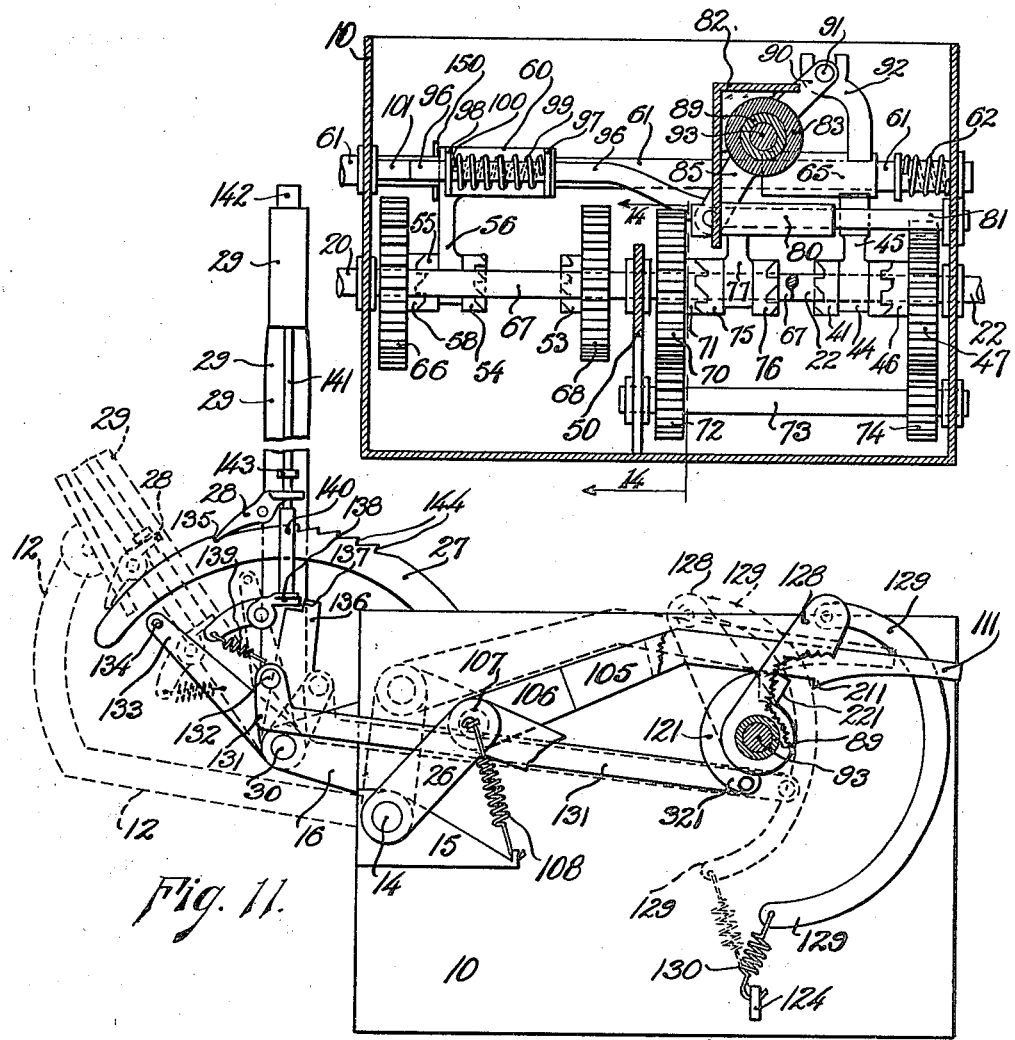

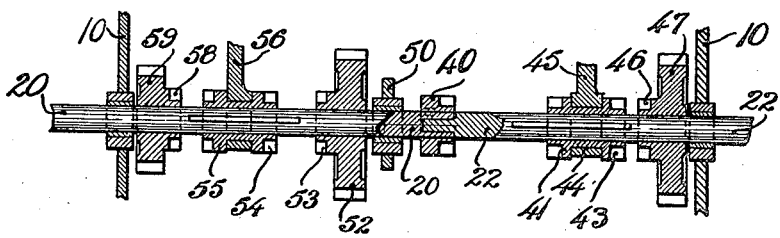
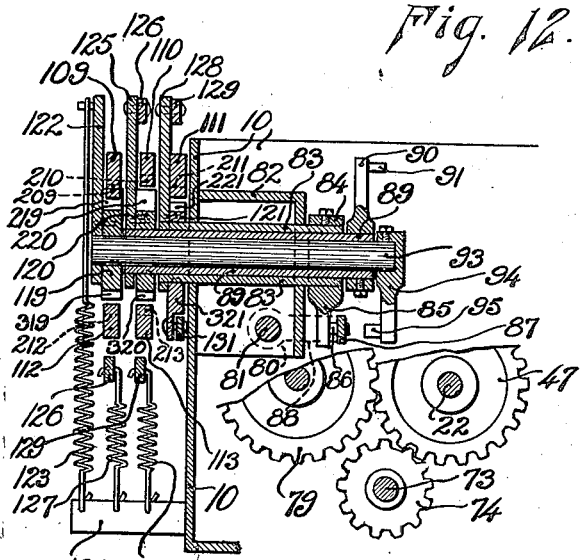
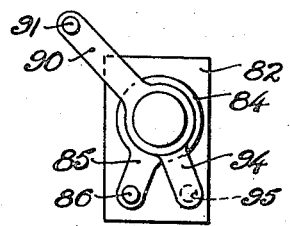
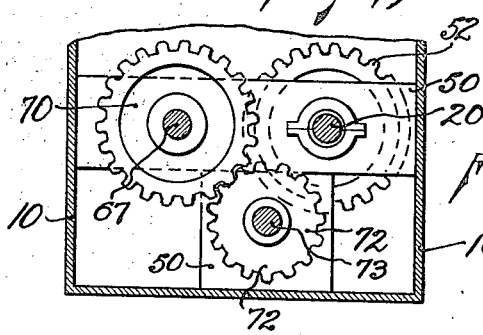

Patented Sept. 11, 1923.

1,467,765

UNITED STATES PATENT OFFICE.

HARRY W. McMULLIN, OF FRANKFORT, INDIANA.

GEAR SHIFT.

Application filed January 20, 1921. Serial No. 438,638.

*To all whom it may concern:*

Be it known that I, HARRY W. McMULLIN, a citizen of the United States, residing at Frankfort, county of Clinton, and State of Indiana, have invented certain new and useful Improvements in Gear Shifts; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a gear shift for transmissions, more particularly for automobiles, which gear shift for all forward speeds may be manipulated entirely through the pedal which controls the power clutch.

Briefly, the invention comprises a plurality of draw bars operable by the clutch pedal, which bars co-operate with a plurality of cams, each cam having a pair of engaging shoulders. The draw bars are arranged in two sets, one of which is positioned on each side of the cams for the purpose of rotating the cams in opposite directions, the cams being mounted on shafts having oscillating arms which control clutch-shifting arms for the purpose of moving transmission clutches longitudinally of main shafts to cause said clutches to selectively engage gears rotatably mounted on said main shafts. Said main shafts are the power shaft driven from the clutch and the drive shaft which leads to the differential, said two shafts being in longitudinal alignment. Said clutches are so operated that said two shafts are directly connected when in high. For the purpose of obtaining low and intermediate speeds, an auxiliary shaft with a series of gears is provided, said gears meshing with the gears on the main shafts. To obtain reverse, another cam operable by a lever and controlling clutch-shifting means is provided, a draw bar being connected with the clutch pedal to return the reverse cam to normal position when the clutch pedal is operated. Whenever the clutch pedal is operated, the initial portion of its movement first releases the power clutch, while a following portion of said movement produces the gear-shifting operation. When the power clutch is released, it is automatically returned to normal position by a spring, allowing the power clutch to engage after the gears have been shifted. The parts are adapted to be thrown into neutral position by means of a cam operable by the emergency brake lever, which cam shifts a shaft upon which the high and low clutch-shifting arms are mounted to cause the low clutch to be slightly disengaged. It is essential, however, that the parts be initially in low position.

In the drawings:

Fig. 2 is a side elevation, showing the draw bar arrangement in neutral position;

Fig. 3 is a vetical longitudinal section taken approximately on the line 3, 4—6, 8 of Fig. 1, the parts being shown in neutral position;

Fig. 4 is a longitudinal vertical section on said line 3, 4—6, 8, showing the transmission clutches in low position;

Fig. 5 is a side elevation, showing the respective cam and emergency brake lever in low position;

Figure 1:
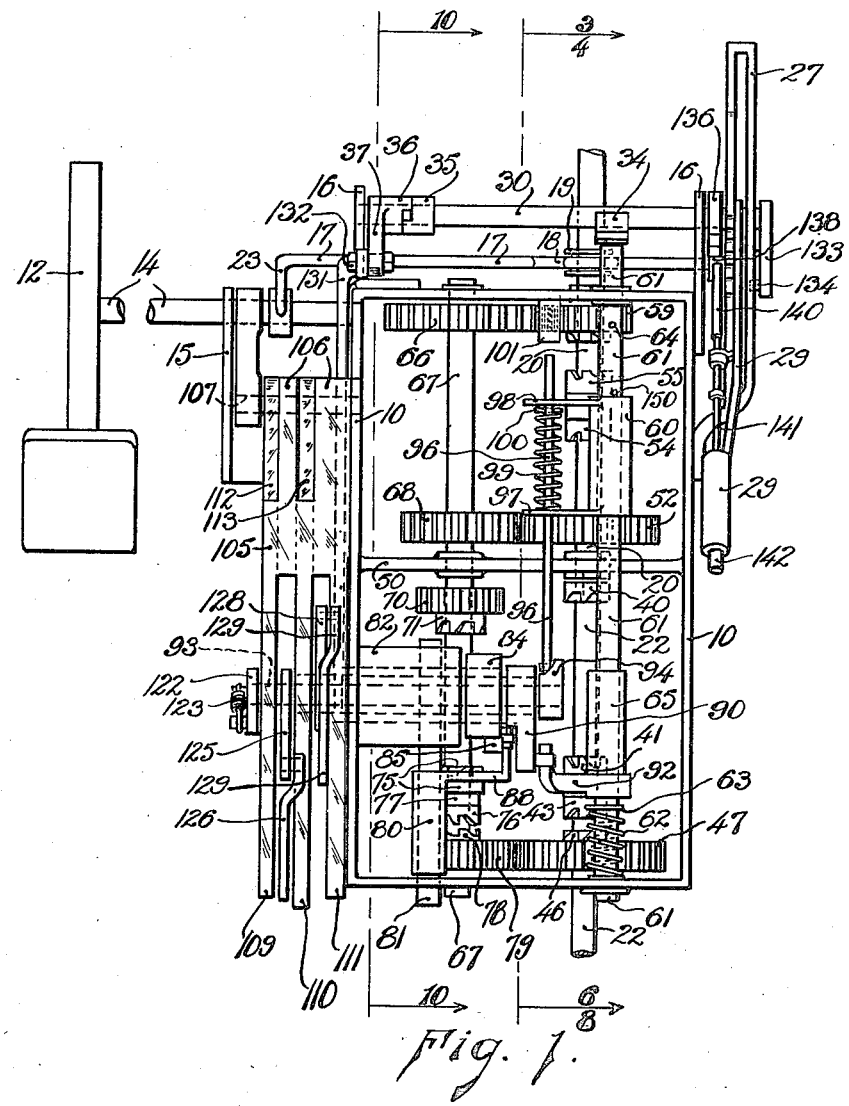
Fig. 1 is a plan of the gear-shifting mechanism, showing the parts in neutral position, the transmission clutches at the rear portion of the gear shift being slightly disengaged to better show their construction and arrangement.
Figure 1:
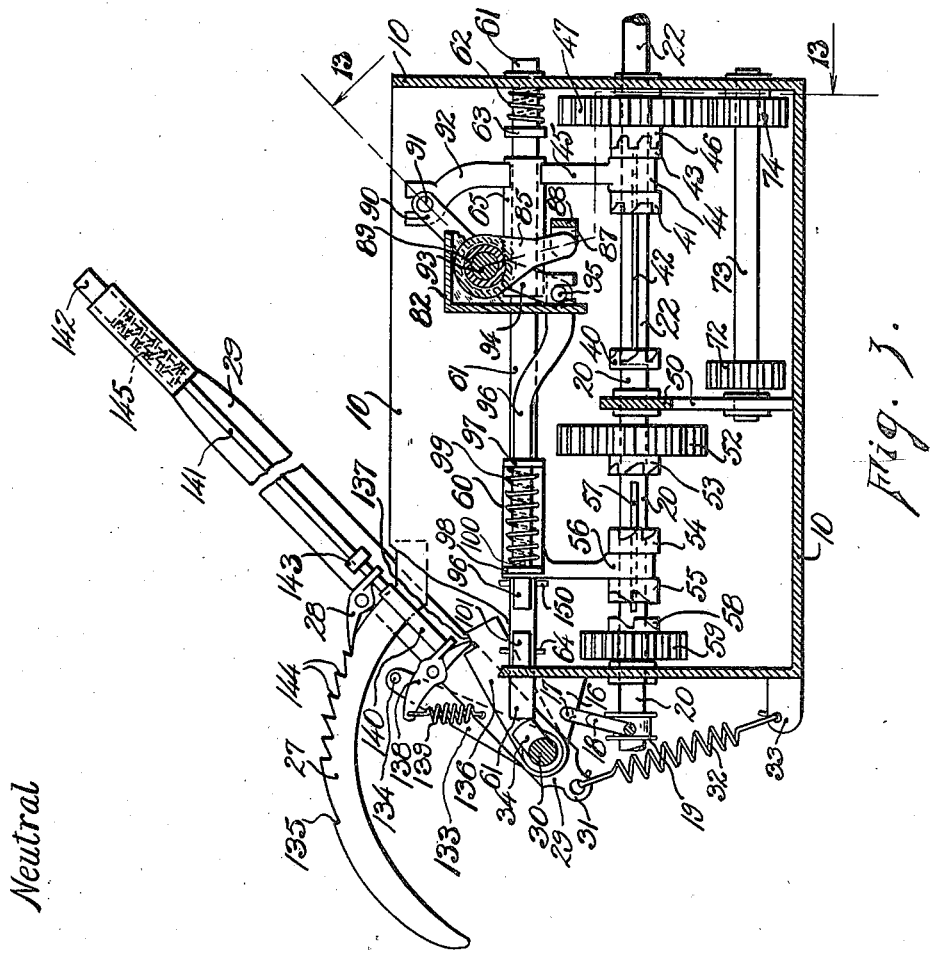
Figure 7:
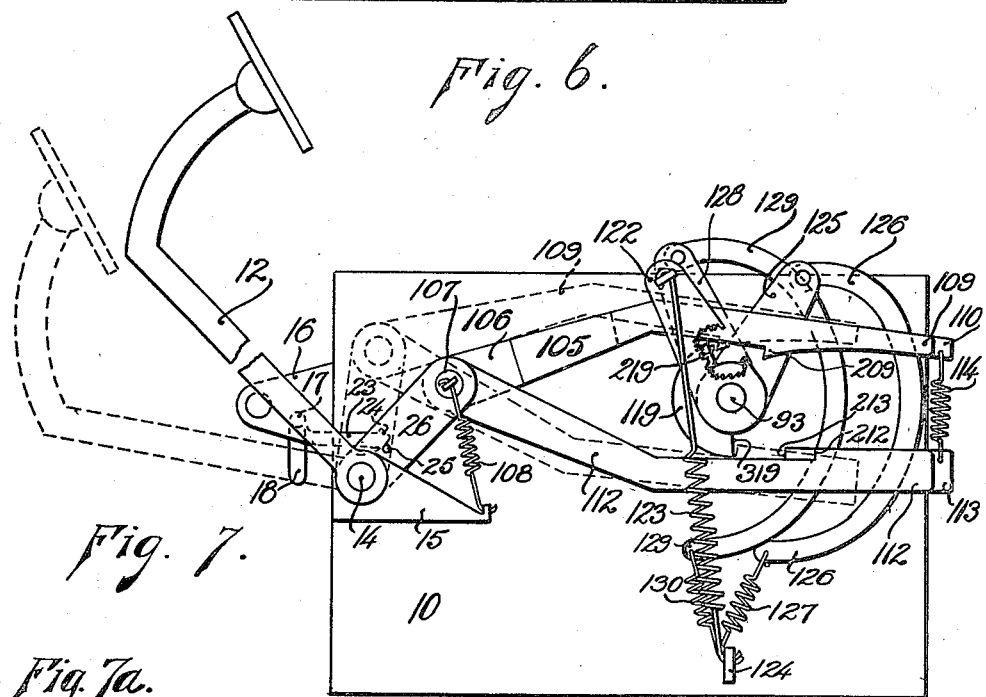
Fig. 7 is a side elevation showing the respective cams in intermediate position.
Figure 7A:
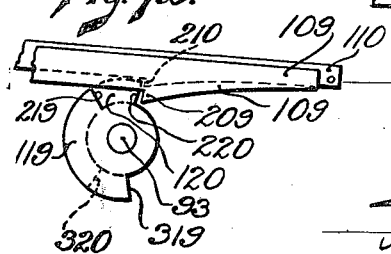

Fig. 7$^a$ is a detail, showing the arrangement of the cams and the upper draw bars after the draw bars have been returned to normal position, showing the shift to intermediate which places the second draw bar in position to move the respective cam to high position upon the next movement;

Fig. 8 is a vertical section on the line 3, 4—6, 8, showing the parts in high position;

Fig. 9 is a side elevation, showing the respective cam in high position;

Fig. 10 is a longitudinal vertical section taken on the line 10—10 of Fig. 1, showing the shifting mechanism in reverse position;

Fig. 11 is a side elevation, showing the respective draw bar and cam in reverse position;

Fig. 12 is a longitudinal section through the aligned power and drive shafts, showing the mounting of the gears and clutches thereon;

Fig. 13 is a vertical cross section on the line 13—13 of Fig. 3; and

Fig. 14 is a fragmentary cross section taken on the line 14—14 of Fig. 10;

Fig. 15 is a detail elevation showing the oscillating arms on the inner ends of the rotary cam sleeves, which arms operate the clutch shifting means.

In Figs. 4 to 11, parts are omitted which are not directly employed in obtaining the respective positions.

A casing or frame 10 is shown, which carries various parts of the device. An ordinary clutch pedal 12 is mounted upon a stub shaft 14 journaled in the casing 10 and in a bracket 15. Ears 16 are mounted upon the forward end of the casing 10 and have journaled therein a transverse rod 17 carrying a depending yoke 18 which operates the power clutch collar 19 on the forward end of the power shaft 20. Said shaft 20 is journaled in the casing 10 and in a transverse wall 50 within the casing 10, said shaft 20 being aligned with the drive shaft 22, which is journaled in the casing 10 and in a clutch part 40 on the rear end of the shaft 20, said drive shaft 22 extending rearwardly to the differential. The rod 17 has an offset rearwardly-extending arm 23 with an upwardly curved tip 24 which bears upon a pin 25 mounted in a link 26, which is fixed to the pedal shaft 14, whereby said pin 25 causes the arm 23 to be elevated to release the clutch by means of the collar 19 whenever the pedal 12 is moved. The upper end of the link 26 is pivotally connected with an upper set A and a lower set B of draw bars having pivotal relation with each other, hereinafter described.

A quadrant 27 is fixed to the casing 10 and has notches co-operating with a dog 28 pivoted upon and operable by means of an emergency brake lever 29 whose lower end is pivoted upon a transverse shaft 30 pivoted in said forwardly-extending ears 16. The lower end of said lever 29 is conveniently provided with an eye 31 in which there is engaged one end of a contracting spring 32 whose other end is fixed to an ear 33 on the casing 10, said spring tending to return and hold the lever 29 in its normal upright position.

Said shaft 30 also has fixed thereon a cam block 34 adapted to engage the projecting end of a shaft 61 to move the respective low clutch out of engaging relation. Said shaft 30 also has fixed thereon a clutch part 35 adapted to engage a second clutch part 36 loosely mounted on the shaft 30 and carrying an integral arm 37 whereby the reverse draw bar may be operated when the brake lever 29 is moved forward, as hereinafter described.

The rearward end of the power shaft 20 has a clutch member 40 fixed thereon in which is journaled the forward end of the drive shaft 22. A clutch part 41 adapted to engage with the clutch part 40, is splined on the shaft 22, as indicated at 42, and is integral with a clutch part 43, said parts 41 and 43 being shiftable by means of a collar 44 on a shifting arm 45. The clutch 43 co-operates with a clutch 46 on a gear 47 rotatably mounted on the shaft 22, the clutch parts 43 and 46 being constructed for rotation thereof in either direction. The rear end of the power shaft 20 is journaled in a transverse wall 50 in the casing 10 and has journaled thereon adjacent said wall a gear 52 for use at intermediate speed, this gear carrying a clutch part 53 adapted to mesh with a part 54 integral with a low clutch part 55 and shiftable by means of an arm 56, said clutch parts 54 and 55 being splined on the shaft 20, as indicated at 57. The part 55 is adapted to engage with a clutch part 58 on a low gear 59 rotatable upon the shaft 20. The shifting arm 56 is carried by a sleeve 60 slidable upon a longitudinally-extending shaft 61, upon whose rear end a spring 62 is positioned between the rear wall of the casing 10 and a fixed collar 63, this spring 62 urging the shaft 61 forward and a pin 64 in the forward end of the shaft being adapted to engage the front wall of the casing 10 to limit the forward movement of said shaft 61. When said part 64 engages said front wall, the clutch part 55 may engage the clutch part 58 for low speed, as shown in Figure 4. A second pin 150 is provided in the shaft 61 and is adapted to engage the forward end of the sleeve 60 when said sleeve 60 and arm 56 are in low position. However, when the brake lever 29 is moved rearward, as shown in Figures 1, 2 and 3, the cam 34 engages the forward end of the shaft 61 and causes the pin 150 to force the sleeve 60 slightly rearward to break engagement between the clutch parts 55 and 58, thus placing the parts in neutral position as shown in these figures. A sleeve 65 also slidable upon the shaft 61 carries a shifting arm 45. The means for shifting the two sleeves 60 and 65 will be presently described.

For the purpose of co-operating with the shafts 20 and 22 and the gears thereon to produce other speeds than high, a large gear 66 is fixed on a longitudinally-extending auxiliary shaft 67 journaled in the front and rear walls of the casing and in the partition wall 50. A gear 68 is also fixed on the shaft 67 in mesh with the gear 52 and preferably of about the same size, these gears being used for intermediate speed. Rotatably mounted on the shaft 67 is a reverse gear 70 having a clutch part 71, said gear 70 meshing with a small gear 72 fixed on a stub shaft 73 journaled in the rear wall of the casing 10 and in the partition wall 50, the rear end of the shaft 73 having another gear 74 fixed thereon and in mesh with the main gear 47 on the drive shaft 22. Co-operating with the clutch part 71 is a clutch part 75 integral with a corresponding part 76, said two parts 75 and 76 being splined on the shaft 67 and shiftable by means of an arm 77. The clutch part 76 is adapted to co-operate with a clutch part 78 (Fig. 1) on the gear 79 rotatably mounted on the shaft 67 and also in mesh with the main gear 47. When the clutch parts 76 and 78 are in engagement with each other, the gear 79 serves to drive the gear 47 for both low and intermediate. When clutch parts 75 engages part 71, gear 47 is driven through the medium of gears 72 and 74 from gear 70, which in turn is driven through the medium of clutch 75, splined on shaft 67, by means of gears 66 and 59 from power shaft 20.

The shifting arms 77 is carried by a sleeve 80 slidable upon a short shaft 81 mounted in the rear wall of the casing 10 and in a wall of a bracket 82 secured to one side wall of the casing 10.

Figure 6:
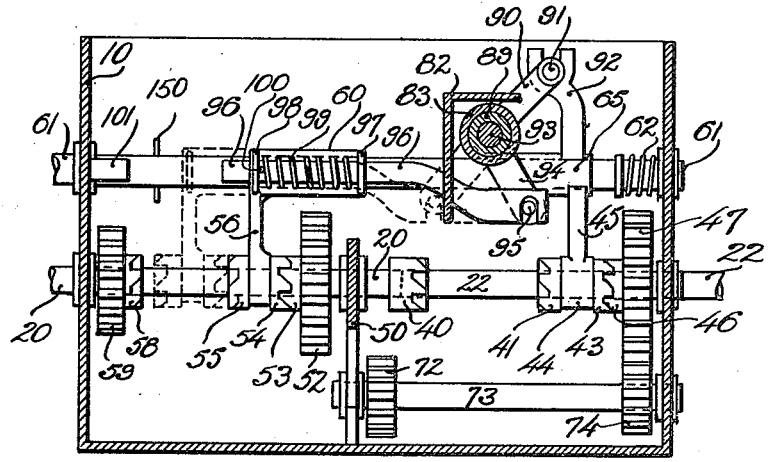
Fig. 6 is a vertical section on the line 3, 4—6, 8, showing the parts in intermediate position.

Journaled in said bracket 82 and in the adjacent side wall of the casing 10 is a sleeve 83 on whose inner end there is fixed a head 84 having a depending arm 85 provided with a pin 86 which works in a notch in the offset extremity 87 of a laterally-extending arm 88 carried by the sleeve 80. Journaled within the sleeve 83 is a second sleeve 89 somewhat longer than the sleeve 83 at each end, the inner end of the sleeve 89 having an arm 90 fixed thereon, which is provided with a pin 91 working in a notch in the upper end of an upwardly-extending arm 92 carried by the sleeve 65. The arm 85 operates the sleeve 80 to throw the clutch parts 75 and 76 from their low and intermediate position when part 76 engages part 78, to the reverse position shown in Fig. 10 where part 75 engages part 71, and vice versa. The arm 90 serves to shift the sleeve 65 to carry the clutch parts 41 and 43 from their intermediate and low position, where part 43 engages clutch 46 as shown in Figs. 4 and 6, to high position, as shown in Fig. 8, where clutch 41 engages clutch 40.

Journaled within the sleeve 89 is a shaft 93 which extends from each end of said sleeve 89. On the inner end of the shaft 93 an arm 94 is fixed, said arm having a pin 95 which works in a notch in a longitudinally-extending arm 96 (Fig. 6), whose forward end is slidable in slots in longitudinally-offset lugs 97 and 98 on the sleeve 60. A coiled spring 99 is positioned around the arm 96 between the lug 97 and a pin 100 mounted in said arm 96 just in the rear of the lug 98. The pin 100 functions only when the parts are in high position, as shown in Fig. 8, when it causes the spring 99 to be compressed while the sleeve 65 presses against the sleeve 60 to move the shifting arm 56 from intermediate position. A stop 101 is provided on the front wall of the casing 10 for engagement by the forward end of the arm 96 to limit forward movement of the latter when it reaches low position.

The upper set of draw bars A is composed of a block 105 whose forward end (Fig. 1) is in the form of spaced fingers 106, these fingers being pivoted to the link 26 by means of a pin 107, with which pin a spring 108 is connected at one end and at the other end to the bracket 15 for the purpose of returning pedal 12, link 26 and the draw bars to normal position. The rear end of the block 105 is in the form of three spaced bars 109, 110 and 111 which overhang projecting ends of the sleeves 83 and 89 of the shaft 93. The lower set B of draw bars comprises a pair of bars 112 and 113 spaced at each end but rigidly connected at an intermediate point so that the two bars operate as a unit. The forward ends of said bars are piovted on the pin 107 in the spaces between and adjacent the fingers 106 of the block A. Bars 110 and 113 conveniently are a little longer than the other bars and have their ends connected by means of a tension spring 114 for the purpose of tending to draw the two sets of bars toward each other and to keep them in engagement with the cams about to be described.

On the outer end of the shaft 93 a cam 119 is fixed as by means of a key. On the outer end of the sleeve 89 a similar cam 120 is keyed, and on the outer end of the sleeve 83 the cam 121 is keyed. On the outer face of the cam 119 an arm 122 is secured, this arm being connected with the upper end of spring 123, the lower end of the spring being secured to a projection 124 adjacent the bottom of the casing, whereby the spring positively holds the arm at either side of dead center. On the outer face of the cam 120 an arm 125 is secured, to the upper end of which there is pivoted a curved link 126, the lower end of which is connected with a spring 127 also secured to the projection 124. To the outer face of the cam 121 an arm 128 is secured whose upper end has a curved link 129 pivotally connected therewith, a spring 130 being secured to the lower end of said link 129 and to the projection 124. In this manner the three springs 123, 127 and 130 hold the respective arms 122, 125 and 128 in proper position on either side of dead center and also assist in the movement of said arms in the desired direction after the same have been carried past dead center by the various draw bars.

The draw bars 109, 110 and 111 respectively lie directly above the cams 119, 120 and 121, and the lower draw bars 112 and 113 respectively lie directly below cams 119 and 120. Cam 119 is provided on top with an engaging shoulder 219 faced rearward, which is adapted to be engaged for rotation of the cam by a shoulder 209 faced forward and provided on the draw bar 109. Said cam 119 is also provided with a lower shoulder 319 faced rearward, adapted to be engaged by the forwardly facing shoulder 212 on the lower draw bar 112. Cam 120 is provided with the upper rearwardly-facing shoulder 220 adapted to be engaged by the forwardly-facing shoulder 210 on the upper draw bar 110, the lower rearwardly-facing shoulder 320 being provided for engagement by a forwardly-facing shoulder 213 on the lower draw bar 113. Cam 121 has a rearwardly-faced shoulder 221 to be engaged by a forwardly-faced shoulder 211 on the upper draw bar 111. On the lower side of the cam 121 a projection 321 is provided to which there is pivotally connected a draw bar 131 which extends forward to the forward end of the casing, where it is pivotally connected at 132 to the arm 37 which is integral with the clutch member 36 loosely mounted on the transverse shaft 30.

The cam 119 co-operating with the two draw bars 109 and 112 serves to move the shifting arm 56 on sleeve 60 from low to intermediate and from intermediate back to low, the shoulder 212 in engagement with shoulder 319 moving the parts to low position, and the shoulder 209 on the bar 109 engaging the shoulder 219 to move the arm 56 to intermediate position. The cam 220 in co-operation with draw bar 110 moves the shifting arm 45 from the low-intermediate position indicated in dotted lines in Fig. 8 to the high position indicated in solid lines, the spring 127 causing the sleeve 65 to press against the sleeve 60 and force the same forward against the tension of the light spring 99, whereby the same is compressed between the lug 97 and the pin 100 and the clutch 54 is withdrawn from the clutch 53 without movement of the bar 96 or its connecting arm 94. The lower draw bar 113 co-operating with the lower shoulder 320 of the cam 120 serves to return the cam 120, the arm 92 and the sleeve 65 to the low-intermediate position. It will also be noted that if downward motion of the pedal 12 is continued when the parts are moved from high to intermediate, the shoulder 212 on the draw bar 112 will engage the face 319 of cam 119 and return said cam 119 to low position. Thus, it is possible after reaching high to return to intermediate or to continue the motion so as to return to low.

The operations just described are made possible because of the fact that the two sets A and B of draw bars are thrown against those cam faces which extend farthest upward and farthest downward by the spring 114, and also by reason of the fact that the under face of the draw bar 110 lies sufficient above the under face of the draw bar 109 that when the cam 119 is in its low position, as shown in Figure 5, the whole block 105 is so elevated by engagement of the cam 119 with the under face of bar 109 as to cause the shoulder 210 of bar 110 to be lifted above the portion of its cam 120 adjacent the shoulder 220. This will be clear from an inspection of Fig. 7ª. However, when shoulder 209 of bar 109 engages shoulder 219 to move the cam 119 to intermediate position, the bar 109 is dropped down upon the upper edge of the face 219 low enough to bring the shoulder 210 of bar 110 into position to engage the shoulder 220. Thus, when the pedal 12 is again moved forward, the cam 120 is rotated forward so as to bring the shifting arm 45 into high position.

With reference to gearing in respect to the speeds forward, it will be noted, referring to Figs. 1 and 4, that when in low, power will be transmitted from power shaft 20 to clutch part 55, through clutch 58 to gear 59, thence to gear 66 and by way of shaft 67 to clutch 76, to clutch 78 and gear 79 to gear 47, to clutch part 46 and thence by way of clutch part 43 and spline 42 to the drive shaft 22. When clutch 54 is moved into engagement with clutch 53, intermediate is obtained, the power being carried by spline 57 from power shaft 20 to the clutch parts 54 and 53, thence from gear 52 to gear 68 and by way of shaft 67 to clutch part 76 and 78 and from gear 79 to gear 47 and shaft 22, as above described, for low. When sleeve 65 is shifted to high position, as shown in Fig. 8, clutch 41 is brought into engagement with clutch 40 and sleeve 65, under influence of spring 127, forces the sleeve 60 forward to withdraw the arm 56 and the clutch part 54 to free it from the clutch part 53. This brings the power shaft 20 into direct connection with the drive shaft 22 by means of the clutch parts 40 and 41 and the spline 42.

When the parts are in neutral, as shown in Figs. 1, 2 and 3, and as indicated in dotted lines in Figs. 4 and 5, it is merely necessary to release the lever 29 so that the cam block 34 will disengage the shaft 61 and allow the spring 62 to return said shaft to normal position, so that clutch part 55 will mesh with the part 58, thus throwing the shift into low.

In Fig. 6, the dotted lines indicate a position from which the shifting arm and sleeve have been moved in order to be brought into intermediate. In Fig. 7 the dotted lines indicate the extent of movement of the pedal and the draw bars to rotate the cam 119 to bring it into intermediate position, the solid lines indicating the normal position of the parts after being returned by the spring 108 in which position the power clutch on the shaft 20 is engaged with the engine shaft. In Fig. 8 the dotted lines indicate a low-intermediate position of the shifting arm 45 and sleeve 65, and in Fig. 9 the dotted lines indicate the amount of movement of the parts in moving the cam 120 to high position. From Fig. 9 it will be clear that if movement were continued to cause shoulder 213 to engage shoulder 320, the cam 120 would be returned to intermediate position.

In order to throw the shift into reverse, an arm 133 is provided which is fixed upon the end of the shaft 30 adjacent the lever 29, said arm having an inwardly-projecting pin 134 adapted to be engaged by the side of the lever 29. When in the normal position of the lever 29, the dog 28 engages a notch 135 on the rack 27. When the dog 28 is released from said notch 135, the lever 29 may be moved forward from its normal or full-line position in Fig. 11 to the dotted line position carying with it the arm 133 by engagement with the pin 134 to the full-line position of the arm 133. The lever is then returned to its normal position, leaving the arm 133 in the full-line position of Fig. 11. This movement has resulted in engagement of the clutch 35 on the shaft 30 with the movable clutch part 36 thereon to cause the arm 37 (Fig. 1) to pull the draw bar 131 forward from its dotted line position to the full-line position of Fig. 11 and throwing the arm 128 and link 129 from the dotted line to the full-line position. This movement has caused rotation of the cam 121 into a position where it will be engaged by the shoulder 211 on the upper draw bar 111, preparatory to return of said cam 121 to normal position. It will be noted that when in normal position, the cam 121 has been forward beyond the path of movement of the shoulder 211. When said cam 121 is rotated to the full-line position, the depending arm 85 is swung forward to cause the arm 88 to shift the sleeve 80, which in turn shifts the shifting arm 77 to carry the clutch 76 out of engagement with the clutch 78 and bring the clutch 75 into engagement with the clutch 71 on the reverse gear 70. Thus, by the application of power from the shaft 67 through the clutch 71—75 and gear 70, the rotation of the main gear 47 through the medium of the gears 72 and 74 is reversed. In order to return from reverse to low, it is merely necessary to depress the pedal 12 so that the shoulder 211 on draw bar 111 engages the shoulder 221 of cam 121 and returns the parts.

To throw the shift into the neutral position above described, an arm 136 is fixed on the shaft 30 and is provided with a shoulder 137 for engagement by a dog 138 which is adapted to be depresed against the tension of its spring 139 into the path of said shoulder 137 by the end 140 of a rod 141 mounted on the lever 29 and having a projecting knob 142 controlled by a spring 145 in the handle 29, said knob 142 being depressed against the tension of the spring 145 to bring the dog 138 into engagement with the shoulder 137. This movement also causes the stop 143 on the member 141 to release the dog 28. This preliminary operation is also necessary when moving the lever 29 to reverse position. When drawn rearward, the dog 138 carries the arm 136 rearward so as to bring the cam block 34 into engagement with the end of the shaft 61, as above described. The knob 142 is then released to allow the dog 28 to engage one of the notches 144. If drawn rearwardly to its limit, the lever 29 will also set the brakes. During this movement the pin 150 in the shaft 61 has engaged the spring 60 and withdrawn the clutch 55 from engagement with the clutch 58, as shown in Fig. 3. However, as above indicated, it is necessary that the parts shall have been previously in low position. Otherwise clutch 54 would be in engagement with clutch 53 to give intermediate or the clutches 40 and 41 would have been directly connected, giving high.

I claim:

1. A gear shift comprising a pedal, a plurality of bars directly connected therewith and movable thereby, engaging shoulders on said bars, movable members also having shoulders adapted to be engaged by the shoulders of the bars, and speed-changing means movable from one position to another by said members, said bars being arranged in two series, one of which is above said members and the other below said members.

2. A gear shift comprising a pedal, a plurality of bars directly connected therewith and movable thereby, engaging shoulders on said bars, movable members also having shoulders adapted to be engaged by the shoulders of the bars, and speed-changing means movable from one position to another by said members, said bars being arranged in two series, one of which is above said members and the other below said members, the shoulders on said members also being in two series for engagement by the two series of bars.

3. A gear shift comprising a pedal, a plurality of bars connected therewith and movable thereby, engaging shoulders on said bars, movable members also having shoulders adapted to be engaged by the shoulders of the bars, and speed-changing means movable from one position to another by said members, said bars being arranged in two series, one of which is above said members and the other below said members, the shoulders on said members also being in two series for engagement by the two series of bars, the bars of each series being rigidly connected as a unit, with the shoulder on one bar having a different spacing relative to the shoulder of the respective member than the shoulder of another bar has to the shoulder of its respective member.

4. A gear shift comprising a pedal, a plurality of bars movable thereby and having engaging shoulders thereon, rotary members having shoulders thereon engageable by the shoulders of said bars, and speed-changing means movable by said rotary members from one position to another.

5. A gear shift comprising a pedal, a plurality of bars movable thereby and having engaging shoulders thereon, rotary members having shoulders thereon engageable by the shoulders of said bars, and speed-changing means movable by said rotary members from one position to another, said bars being arranged in two series, one of which is above said members and the other below said members.

6. A gear shift comprising a pedal, a plurality of bars movable thereby and having engaging shoulders thereon, rotary members having shoulders thereon engageable by the shoulders of said bars, and speed-changing means movable by said rotary members from one position to another, said bars being arranged in two series, one of which is above said members and the other below said members, the shoulders on said members also being in two series for engagement by the two series of bars.

7. A gear shift comprising a pedal; a plurality of bars movable thereby and having engaging shoulders thereon; rotary members having shoulders thereon engageable by the shoulders of said bars; and speed-changing means movable by said rotary members from one position to another, said bars being arranged in two series, one of which is above said members and the other below said members, the bars of each series being rigidly connected as a unit, with the shoulder on one bar having a different spacing relative to the shoulder of the respective member than the shoulder of another bar has to the shoulder of its respective member.

8. A gear shift comprising a pedal, a plurality of bars connected with and movable by said pedal, a plurality of pivoted cam members having shoulders adapted to be engaged and moved by said bars, and speed-changing means movable by said cam members, said bars being arranged in two series, one series being on one side of the cam members and one on the other side, each series being movable together as a unit, only one cam being adapted to be moved at a time, one series being adapted to engage one side of the cams and the other series the other side.

9. A gear shift comprising a pedal, a plurality of bars connected with and movable by said pedal, a plurality of pivoted cam members adapted to be engaged and moved by said bars, only one cam being adapted to be moved at one time, and speed-changing means movable by said cam members.

10. A gear shift comprising a pedal, a plurality of bars connected with and movable by said pedal, a plurality of pivoted cam members having shoulders adapted to be engaged and moved by said bars, and speed-changing means movable by said cam members, said bars being arranged in two series, one series being on one side of the cam members and one on the other side, each series being movable together as a unit, only one cam being adapted to be moved at a time, one series being adapted to engage one side of the cams and the other series the other side, said bars having different spacings from the shoulders of the respective cam members, so that one bar will be maintained out of engagement with its cam when another cam is in position to elevate the respective bar, and when said other cam is moved to position to lower said respective bar said other bar will be lowered to position to engage its cam.

11. A gear shift comprising a pedal, a plurality of bars connected with and movable by said pedal, a plurality of pivoted cam members adapted to be engaged and moved by said bars, only one cam being adapted to be moved at one time, speed-changing means movable by said cam members, said bars having different spacings from the shoulders of the respective cam members, so that one bar will be maintained out of engagement with its cam when another cam is in position to elevate the respective bar, and when said other cam is moved to position to lower said respective bar said other bar will be lowered to position to engage its cam.

12. A gear shift comprising a pedal, a plurality of bars movable by said pedal, a plurality of pivoted cams having shoulders adapted to be engaged by the bars for moving the cams, and speed-changing means movable by said cams, said bars having different spacings from the shoulders of the respective cam members, so that one bar will be maintained out of engagement with its cam when another cam is in position to elevate the respective bar, and when said other cam is moved to position to lower said respective bar said other bar will be lowered to position to engage its cam.

13. A gear shift comprising a pedal, a plurality of bars movable by said pedal, a plurality of movable members adapted to be engaged and moved by said bars and speed-changing means movable by said members, said bars being arranged in two series, one series being on one side of said members for moving them in one direction, and the other series being on the other side of said members for moving them in the opposite direction.

14. A gear shift comprising a pedal, a plurality of bars movable thereby, movable members adapted to be engaged and moved by said bars, and speed-changing means movable from one position to another by said members, said bars being arranged in two series, said two series being pivoted together, one of said series being on one side of said members and the other series on the other side of said members.

15. A gear shift comprising a pedal, a plurality of bars movable thereby, a plurality of cam members adapted to be engaged and moved by said bars, speed-changing means movable by said cam members, said bars being arranged in two series, each series being movable together as a unit, the two series being pivotally connected, one series being on one side of said cam members, and the other series on the other side, and means for retaining said series in engagement with said cam members.

16. A gear shift comprising a pedal, a plurality of bars movable thereby, a plurality of cam members adapted to be engaged and moved by said bars, speed-changing means movable by said cam members, said bars being arranged in two series, each series being movable together as a unit, the two series being pivotally connected, one series being on one side of said cam members and the other series on the other side, and means for retaining said series in engagement with said cam members, one of said series being adapted to engage and move said cam members in one direction, and the other series being adapted to engage the opposite sides of said cam members to return the same.

17. A gear shift comprising a pedal, a plurality of bars movable thereby, a plurality of pivoted cam members concentrically mounted and operatively connected to said bars, and speed-changing means movable by said cam members, said bars being arranged in two series disposed on opposite sides of said cam members and adapted to rotate said cam members in opposite directions.

18. A gear shift comprising a plurality of shafts, a clutch splined on each shaft and slidable thereon, a swinging arm connected with each clutch to shift the same, a pivoted member for each arm and to which the arm is connected, and means for rotating each member to move the arms in opposite directions.

19. A gear shift comprising a plurality of shafts, a clutch splined on each shaft and slidable thereon, a clutch shifting member for each clutch, a rod on which said members are slidable, and a swinging arm connected with each member to move the same in opposite directions 20. A gear shift comprising a plurality of shafts, a clutch splined on each shaft and slidable thereon, a rod extending longitudinally of the shafts, a clutch shifting member on said rod and engaging one of said clutches, said rod being slidable longitudinally, a projecting member on said rod to engage said shifting member, a lever, and a swinging cam part connected with said lever and movable thereby adapted to engage said shifting member to move the same to release the respective clutch.

21. A gear shift comprising a plurality of shafts, gears rotatable on said shafts, clutches splined on said shafts and slidable thereon, clutch parts on the gears to be engaged by the clutches, a rod, arms slidable on the rod and engaging the clutches to shift the same, an auxiliary shaft having gears fixed thereon meshing with the first mentioned gears, swinging arms connected with said slidable arms, pivoted members on which said swinging arms are mounted, cam members on said pivoted members, a plurality of bars adapted to engage said cam members to move the same in opposite directions, and a pedal to move said bars.

22. A gear shift comprising a plurality of shafts, gears rotatable on said shafts, clutches splined on said shafts and slidable thereon, clutch parts on the gears to be engaged by the clutches, a rod, arms slidable on the rod and engaging the clutches to shift the same, an auxiliary shaft having gears fixed thereon meshing with the first mentioned gears, movable arms connected with said slidable arms, movable members on which said movable arms are mounted, a plurality of bars adapted to engage said movable members to move the same in opposite directions, and a pedal to move said bars.

23. A gear shift comprising a pivoted cam, a bar connected therewith, a lever, an arm operated by said lever and engaging said bar for rotation of the cam, a speed-changing device movable by said cam, a draw bar adapted to engage said cam to return the same, and a pedal to move said draw bar.

24. A gear shift comprising a plurality of movable members for forward speeds, a pedal, a plurality of draw bars movable by said pedal and adapted to engage and move said movable members, speed-changing devices movable by said members, an additional movable member, a bar connected therewith to move the same in one direction, a lever, an arm on the lever engaging the bar, a speed-changing device movable by said additional member, and an additional draw bar to return said additional member.

In testimony whereof I affix my signature.

HARRY W. McMULLIN.